(12) United States Patent
Van Kommer (10) Patent No.: US 6,799,171 B1
(45) Date of Patent: Sep. 28, 2004

(54) APPLICATOR AND METHOD FOR COMBATING PESTS, ESPECIALLY COCKROACHES

(75) Inventor: Robert Van Kommer, Villar-sur-Glâne (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/786,123

(22) PCT Filed: Nov. 17, 1998

(86) PCT No.: PCT/CH98/00497

§ 371 (c)(1),
(2), (4) Date: Mar. 1, 2001

(87) PCT Pub. No.: WO99/31975

PCT Pub. Date: Jul. 1, 1999

(30) Foreign Application Priority Data

Sep. 1, 1998 (EP) ............................................ 98810867

(51) Int. Cl.[7] .............................................. G06F 15/18
(52) U.S. Cl. .............................. 706/27; 706/30; 706/20
(58) Field of Search .............................. 706/27, 30, 20

(56) References Cited

U.S. PATENT DOCUMENTS

| | | | | |
|---|---|---|---|---|
| 4,970,822 A | * | 11/1990 | Sherman ...................... | 431/31 |
| 5,220,640 A | | 6/1993 | Frank .......................... | 706/20 |
| 5,425,130 A | * | 6/1995 | Morgan ........................ | 704/270 |
| 5,832,108 A | * | 11/1998 | Fukita et al. ................ | 382/159 |

FOREIGN PATENT DOCUMENTS

| | | | |
|---|---|---|---|
| DE | 3221985 A | * | 12/1983 |
| WO | WO9602134 A | * | 2/1996 |
| WO | WO 97 29437 | | 8/1997 |

OTHER PUBLICATIONS

Young, A Review of Large–vocabulary Continuous–speech Recognition, IEEE Signal Processing Magazine, Sep. 1996, pps 45–57.

Ghosh et al., "Classification of Spatiotemporal Patterns with Applications to Recognition of Sonar Sequences", Neural Representation of Temporal Patterns, Plenum Press, New York, 1995, pp. 227–249.

Bourlard, "Connectionist speech recognition: a hybrid approach", Kluwer Academic Publishers, The Netherlands, Chapter 4 Multilayer Perceptrons, pp. 59–80.

Greenberg, "On the Origins of Speech Intelligibility in the Real World", University of California, Berkeley, International Computer Science Institute, pp. 23–32.

* cited by examiner

*Primary Examiner*—George B. Davis
(74) *Attorney, Agent, or Firm*—Oblon, Spivak, McClelland, Maier & Neustadt, P.C.

(57) ABSTRACT

A neural network system including a plurality of tiers of interconnected computing elements. The plurality of tiers includes an input tier whereto a sequence of input speech vectors is applied at a first rate. Two of the plurality of tiers are interconnected through a decimator configured to reduce the first rate of the sequence of input vectors. Alternatively, two of the plurality of tiers are interconnected through an interpolator configured to increase the first rate of the sequence of input vectors.

47 Claims, 4 Drawing Sheets

APPLICATOR AND METHOD FOR COMBATING PESTS, ESPECIALLY COCKROACHES

BACKGROUND OF THE INVENTION

1. Field of the Invention

This invention relates to a system of speech recognition. More specifically, this invention relates to a logic unit and a system of speech recognition with the aid of a neural network. This invention also relates, however, to a new neural network for applications other than speech recognition.

2. Discussion of the Background

Methods of performing speech recognition are of crucial importance in particular for the development of new telecommunications services. The qualities required of a speech recognition system are in particular the following:

Precision—systems making it possible to recognize correctly less than a very high percentage, for example less than 85 percent, of words have only few practical applications.

Insensitivity to noise—the systems must allow a satisfactory recognition even in a noisy environment, for example when the communications are transmitted through a mobile telephone network.

Large vocabulary—for a lot of applications it is necessary to be able to recognize a high number of different words—for example more than 5000.

Independence of speaker—a lot of applications require satisfactory recognition regardless of who the speaker is, and the same for speakers unknown to the system.

The known systems of speech recognition generally carry out two distinct tasks. A first task consists in converting the voice into a digital signal and of extracting a sequence of vectors of voice parameters from this digital signal. Different systems are known for executing this task which generally allow conversion of each frame, of 10 milliseconds for example, of voice into a vector ("features vector") containing a group of parameters describing at best this frame in the time and frequency domain.

The second task consists in classifying the sequence of vectors received by means of a classifier and establishing to which class (corresponding, for example, to phonological elements such as phonemes, words or sentences, for example) they correspond with the greatest probability among the classes defined during a learning phase of the system. The problem for classifiers is thus to determine, for each input speech vector, the probability of belonging to each defined class.

Figure 1A:
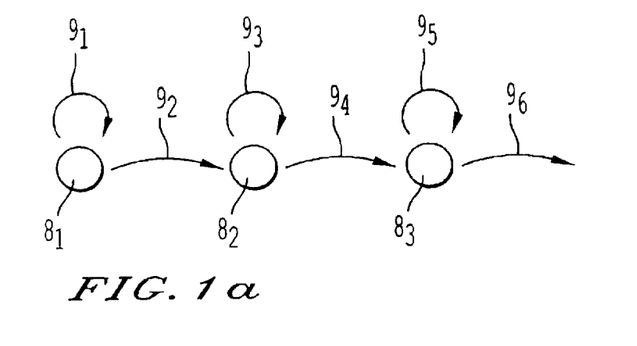
FIG. 1a shows diagrammatically the structure of a hidden Markov model.

The speech recognition systems most widely used at the present time use a classifier functioning with the aid of hidden Markov models, better known by the Anglo-Saxon designation Hidden Markov Models (HMM), and illustrated by FIG. 1a. This statistical method describes the voice through a sequence of Markov states $8_1$, $8_2$, $8_3$. The different states are connected by links $9_1$–$9_6$ indicating the probabilities of transition from one state to another. Each state emits a voice vector, with a given probability distribution. A sequence of states, defined a priori, represents a predefined phonological unit, for example a phoneme or a triphone. A description of this method is given, for example, by Steve Young in an article entitled "A Review of Large-Vocabulary Continuous-Speech Recognition," published in September 1996 in the *IEEE Signal Processing Magazine*. In spite of a very poor modelling of time relations between successive speech vectors, this method currently offers the best rates of recognition.

Figure 1B:
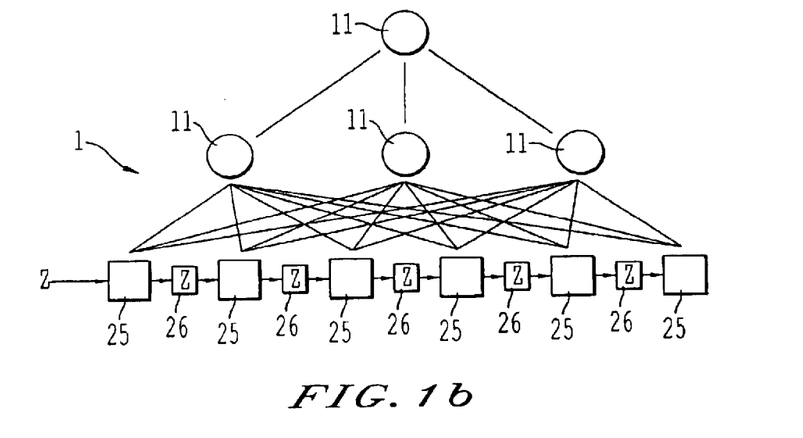
FIG. 1b shows diagrammatically the structure of a network of artificial neurons.

Other systems of classification, which have made it possible to achieve a certain success, use networks of artificial neurons, such as illustrated in FIG. 1b, in particular time delay neural networks (TDNN—Time Delay Neural Networks) or recurrent neural networks (RNN—Recurrent Neural Network). Examples of such systems are described in particular by J. Ghosh et al. in "Classification of Spatiotemporal Patterns with Applications to Recognition of Sonar Sequences" in *Neural Representation of Temporal Patterns*, pages 227 to 249, edited by E. Covey et al., Plenum Press, New York, 1995. All these systems use a delay line comprising registers 25 for the input speech vectors 2 as well as delay elements 26 in their architecture. Computing elements 11 (neurons), interconnected (by means of synapses) with the registers 25 and organized in a hierarchical manner, allow particular phonological elements to be identified. These systems also make it possible to model the time relation between past information and current information, and to correct certain weaknesses of HMMs, without, however, succeeding in replacing them completely.

A more recent approach consists in combining the HMMs with neural networks in hybrid speech recognition systems. Such systems are described, for example, by H. Boulard et al. in "Connectionist Speech Recognition—A Hybrid Approach," 1994, Kluwer Academic Publishers (NL). These systems have the advantage of a better modelling of context and of phonemes than the HMMs. The price to pay for these systems, however, is either a long training time, due to the error back propagation (EBP) algorithm used, or a limited number of weighting coefficients available for modelling the speech signals.

Another approach is disclosed in the American U.S. Pat. No. 5,220,640 of Jun. 15, 1993. This document describes a neural network architecture by which the input signal has been scaled differently by a "time-scaling network." The output signals indicate how the entering signals have been changed in scale correspond to learned patterns.

These different systems generally model each word as a sequence of phones, and are optimized to identify each phone in a speech signal as precisely as possible. A correct identification of each phone ensures in principle a perfect recognition of words or of sentences—insofar as these words and these sentences are correctly modelled. In practice, all these systems have the drawback of a lack of robustness in noisy conditions or of results of variable quality, as indicated in particular by S. Greenberg in "On the origins of speech intelligibility in the real world," ESCA-NATO Tutorial and Research Workshop on Robust Speech Recognition for Unknown Communication Channels, $17^{th}$–$18^{th}$ Apr. 1997, Pont-à-Mousson, France, and by Steve Young in the article indicated further above.

BRIEF SUMMARY OF THE INVENTION

One object of the present invention is thus to propose a system and a method of speech recognition that avoids the drawbacks of prior art systems and methods. More specifically, an object of the present invention is to propose a classifier and a method of classifying speech vectors, improved over prior art classifiers and classification methods.

Another object of the present invention is to improve the performance of a classifier without adding substantially to the complexity, in particular without adding substantially to the number of computing elements.

According to the invention, these various objects are achieved thanks to the features of the independent claims, preferred variants being indicated moreover in the dependent claims.

The invention begins with the observation that speech is more than a linear succession of phones of equal importance for recognition. Experience has shown that even experienced listeners struggle to identify more than 60% of phones presented in isolation; only the context permits the human brain to comprehend sentences and to identify, a posteriori, each phone.

The invention puts this discovery to use by suggesting, for the recognition of speech, integration of features of speech segments much longer than that done in the prior art—for example features of several syllables, of a whole word, even of several words or even of an entire sentence.

To avoid adding to the complexity of the system and the number of computing elements, a hierarchical architecture is proposed, with a system of several tiers. Each tier comprises at least one spatiotemporal neural network (STNN). The rate of signals input in the different tiers of the system is variable, in such a manner that the rate of speech vectors input in the lower tier is adapted, for example, to the recognition of isolated phones, or other brief phonological elements, whereas the rate of signals applied on the upper tiers permits, for example, recognition of longer phonological elements—for example syllables, triphones, words or even entire sentences. Decimeters are provided in at least one tier to reduce the rate of signals applied to the upper tiers. Inversely, interpolators are provided to increase the rate of target signals given to the system during the learning phase.

The invention also proposes an architecture for multirate neural networks, using decimators and interpolators in their architecture. The invention makes it possible to achieve, with a limited number of computing elements (neurons) and synapses, a neural network whose output is dependent upon a large number of speech vectors and/or whose learning capacity is increased.

The invention permits moreover weighting of the importance of different segments of speech (frames), and classifying each speech vector with respect to large number of prior vectors.

BRIEF DESCRIPTION OF THE DRAWINGS

The invention will be better understood with the aid of the description, given by way of example and illustrated by the attached figures.

DETAILED DESCRIPTION OF THE INVENTION

Although the description which follows describes in more detail the particular case of a network of artificial neurons used for recognition of speech, one skilled in the art will understand that the type of neural network claimed can also find other applications, in particular for identification of the speaker or for other tasks not necessarily connected to speech processing, in particular when the content of the information to be analyzed can be classified hierarchically.

Figure 2A:
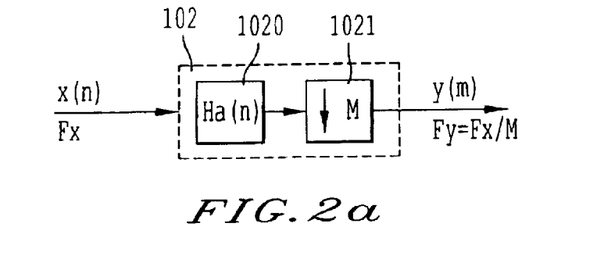
FIG. 2a is a block diagram of a decimator.

According to the invention, speech recognition is carried out by means of a neural network in which at least one computing element (or neuron) comprises a decimator 102, such as illustrated schematically in FIG. 2a. The function of the decimator is to convert a digital input signal x(n) with a rate (sampling frequency) $F_x$ into a digital output signal y(m) with a rate Fy reduced by a whole number factor M.

Given that the input signal x(n), of rate $F_x$, has a spectrum $X(\omega)$ and must be rated down by a whole number factor M: If $X(\omega)$ is different from zero in the frequency interval $0 \leq |F| \leq F_x/2$, one knows from the theory of signals that the signal obtained by selecting only each $M^{th}$ value of signal x(n) is a version folded on itself (aliased) of x(n), with a frequency of foldover distortion of $F_x/2M$. To avoid the alias, it is thus necessary to reduce beforehand the bandwidth of x(n) by a factor $M:F_{max}=F_x/2M$. This operation is carried out, for example, through the decimation filter 1020 with a function of transfer $H_a(n)$ of low pass type. The decimator 102 then comprises a down-sampler 1021 which selects only each $M^{th}$ value and provides a signal y(m) at a rate $F_y$ corresponding to the rate $F_x$ of the input signal x(n) divided by M. The decimator 102 must not be confused with a simple down-sampler.

The transfer function $H_a(n)$ of the filter 1020 can also be chosen in such a way as to carry out other types of filtering of the output signal, for example so as to improve the signal-to-noise ratio, to eliminate echoes, etc.

Other means of achieving a decimator exist, and can likewise be used within the framework of this invention. Such decimators are used in particular in the digital filtering bases such as described by M. Vetterli et al. in "Wavelets and Subband Coding," Prentice Hall, Englewood Cliffs, N.J. 07632. The decimators most widely known use, for example, analysis in the temporal domain, in the domain of modulation or of polyphase type.

Figure 2B:
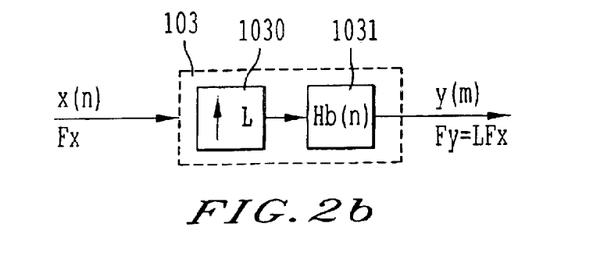
FIG. 2b is a block diagram of an interpolator.

The network of artificial neurons of the invention preferably further comprises an equivalent number of interpolators 103, such as illustrated in FIG. 2b. The function of the interpolators 103 is to convert digital signals x(n) at a rate $F_x$ into signals y(m) of higher rate $F_y=LF_x$. For reasons symmetrical to those explained above, a filtering of the digital signal obtained by the up-sampler 103 is necessary, and is carried out by means of an interpolation filter 1031 with a transfer function $H_b(n)$.

Figure 3:
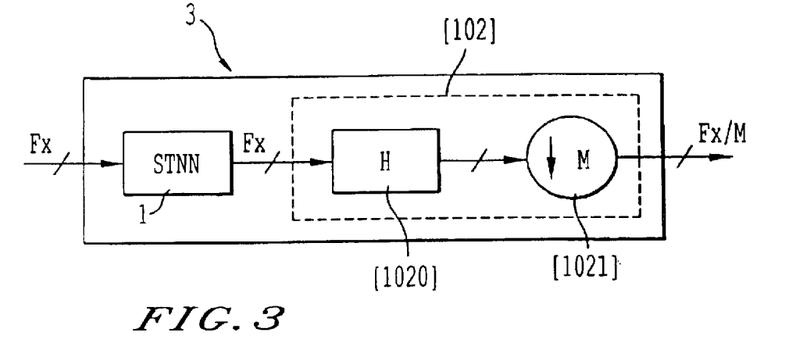
FIG. 3 shows diagrammatically the structure of one tier of a multirate neural network according to the invention.

FIG. 3 illustrates diagrammatically a self-modularization neural network (SMNN) unit 3 according to the invention, made up, for example, of a complete tier or a complete classifier unit according to the invention. The SMNN 3 comprises a spatiotemporal neural network 1 (STNN) of any type, for example of the type illustrated in FIG. 1b. The STNN 1 can also be made up of a finite or infinite multilayer pulse response perceptron (IIR/FIR MLP—Infinite/Finite Multilayer Perceptron), a time delay neural network (TDNN), a recurrent neural network, a gamma network, etc., and generally comprises a set of computing elements, or neurons 11. The STNN 1 receives a signal at input, for example a sequence of speech vectors or a signal delivered through another tier of the neural network, with a rate $F_x$, and delivers another signal at output, for example a vector of calculated parameters, with the same rate $F_x$. According to the invention, the SMNN 3 further comprises a decimation unit [102], comprising for example as many decimators 102 as parameters in the output vector, and allowing the signal rate calculated by the STNN to be reduced. Each decimator 102 in the decimation unit [102] is made up, for example, in the way illustrated in FIG. 2a, and comprises a decimation filter 1020 and a down-sampler 1021, in such a manner that the SMNN 3 delivers at output a vector with a rate $F_x/M$ reduced by M.

Figure 4:
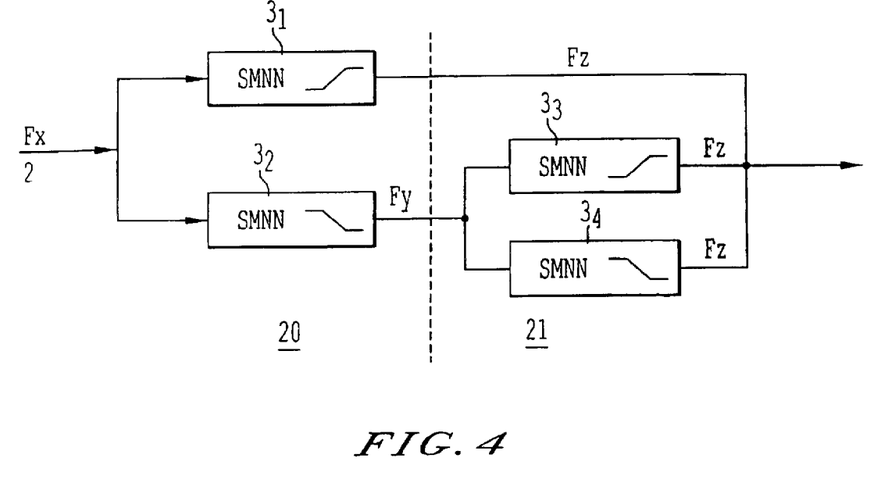
FIG. 4 shows a first example, illustrated diagrammatically, of a multirate and multi-tiered neural network according to the invention.

FIG. 4 illustrates an example of classifier created starting with SMNN units (including decimators) according to the invention. This classifier comprises four SMNN $3_1$–$3_4$ distributed on two tiers 20 and 21. The sequence of speech vectors extracted from the speech signal to be analyzed is input simultaneously in two SMNN $3_1$–$3_4$, one of which comprises a high pass filter and the other a low pass filter. The two SMNN carry out a decimation with a different decimation factor so that the rate of the signal coming from the upper SMNN $3_1$ is $F_z$ whereas the rate of the signal from the other SMNN $3_2$ is $F_y$.

The signal having the rate of $F_y$ is itself input in two SMNN $3_3$–$3_4$ in the second tier 21 of the system of the invention, each delivering an output signal having the rate of $F_z$ and able to have filters with different transfer functions. The signals delivered by the SMNN $3_1$, $3_3$ and $3_4$ are then combined into a single output vector having the rate of $F_2$.

The system of the invention can be trained by means of target vectors applied during a learning phase at the output of an error back propagation (EBP) algorithm of known type. It is possible either to set target vectors at the output of each tier 20, 21, etc. (or part of these tiers only) or at the global output of the system above the top sequence tier. In this latter case, it is necessary to provide interpolators 103 (FIG. 2b) in the SMNN 3 in order to multiply the rate of the target vectors set at the lower tiers.

Figure 5:
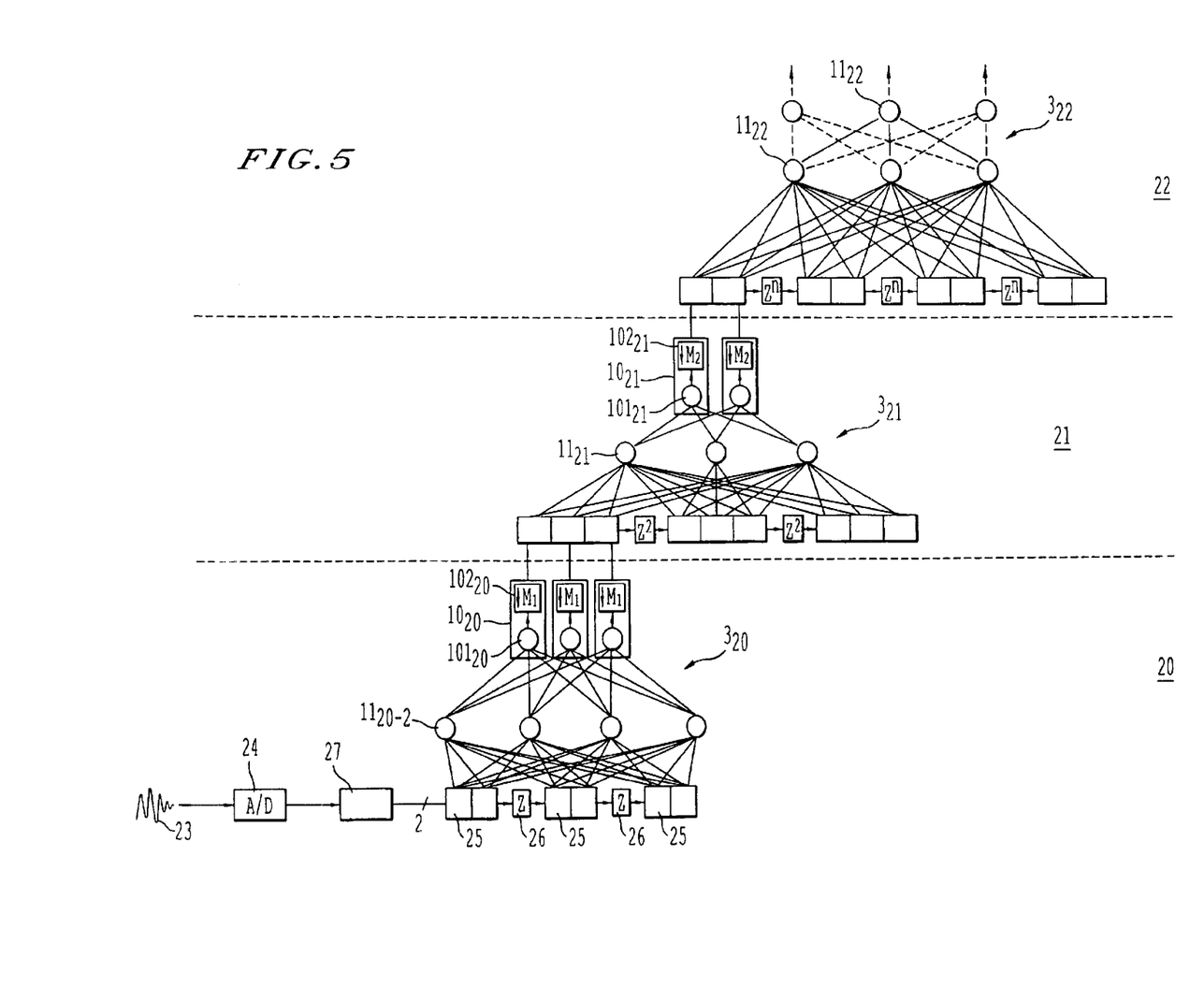
FIG. 5 shows a second example, illustrated in more detail, of a multirate and multi-tiered neural network according to the invention.

FIG. 5 illustrates in a more detailed way a system of speech recognition comprising a multirate neural network according to the invention. This system makes possible recognition of isolated words, for example isolated digits in a voice control system. In the example illustrated, the speech recognition system comprises a classifier, itself including three tiers 20, 21, 22, each tier comprising a three-layered SMNN $3_{20}$, $3_{21}$, $3_{22}$. The output of the classifier indicates the estimate of the most probable class à priori (MAP—Maximum A Posteriori) to which the input vector corresponds. Other configurations with a number of tiers and of layers in each different tier can easily be conceived, however, within the framework of this invention.

The audible signal 23 to be analyzed is first of all converted into a digital signal by an analog-to-digital converter 24 of known type. For each frame of digital signal of predetermined duration, for example 10 milliseconds, a speech vector 2 is determined by the parameterizer 27, also of known type. In the example illustrated, the parameterizer extracts from each frame vectors of two components only; in practice, vectors comprising a much greater number of components, for example 26, are preferably used in order to provide a more complete spatiotemporal representation of the audible signal during the duration of each frame.

The speech vectors 2 thus determined are then input successively into a line of shift registers 25–26. Each vector is first input in a register 25, then after a frame interval z shifted into the following register. In the example illustrated, the line of shift registers comprises 3 registers containing vectors representing three frame intervals, for example 30 milliseconds. In practice, a much longer delay line will preferably be chosen, comprising, for example, nine successive registers. The shift register is supplemented with filling vectors ("dummy signal") before the first vector and after the last vector of the sequence.

Figure 6:
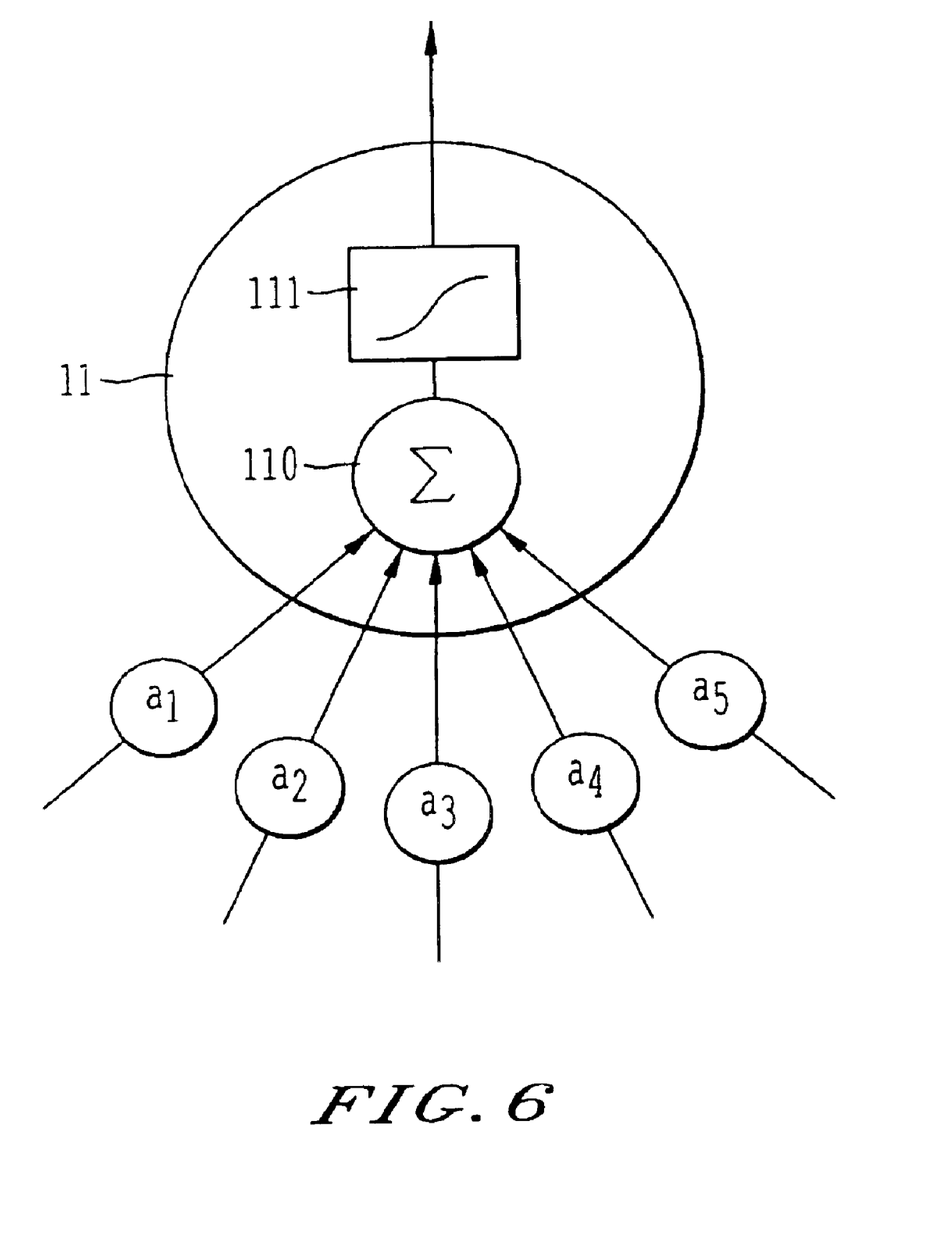
FIG. 6 illustrates diagrammatically a conventional computing element (neuron).

Computing elements (neurons) $11_{20}$ in a hidden intermediate layer are connected with the registers 25 by means of synapses. In the example illustrated, the hidden intermediate layer comprises only 4 computing elements $11_{20}$; in practice, a very much larger number of computing elements will preferably be chosen, for example several hundreds of computing elements. FIG. 6 illustrates an example of a computing element 11 in more detail. In a known way, the computing elements 11 comprise an adder 110 to make a sum of components of vectors in the different registers 25, the sum being weighted with weighting coefficients $a_1$, $a_2$, ... $a_n$ determined during the learning phase of the system. A function of known type, for example a sigmoid function, is then applied by an operator 111 to the calculated sum. In a preferred variant, the network is entirely connected, i.e. all the computing elements $11_{20}$ of the intermediate layer of the first tier are connected through synapses to all the speech vectors of all the registers 25; it is also possible, however, within the framework of this invention to conceive of only partially connected networks.

The first tier further comprises an output layer comprising computing elements (neurons) $10_{20}$ of new type, each including a computer element called specifically $101_{20}$ and a decimator $102_{20}$, as indicated above. Again, although the example illustrated comprises just three output computing elements $10_{20}$, a greater number of elements will preferably be used in practice, for example 24 output elements trained, for example, for recognition of 24 different phonemes. Each computing element $101_{20}$ is completely connected to all the elements $11_{20}$ of the intermediate layer. The computing elements 101 are made up in the same way as the elements 11 described above, and, in a known way, make a sum of the components of the vectors in the different intermediate neurons $11_{20}$, the sum being weighted with weighting coefficients determined during the learning phase of the system. A function of known type, for example a sigmoid function, is then applied to the calculated sum. The computer elements 10120 thus provide at each frame interval a new output vector as a function of speech vectors stored in the registers 25.

According to the invention, these signals are decimated by the decimators $102_{20}$ providing, at output, signals of a rate reduced by a factor $M_1$. The decimators thus provide, at output of the first tier 20, a digital vector, at a rate reduced by a factor $M_1$ with respect to the rate of speech vectors input in the registers. If, for example, the frame interval of speech vectors at the input of the system is 10 milliseconds and the factor of decimation $M_1$ is two, the frame interval of output vectors, at the output of the first tier 20, will be 20 milliseconds. The output vector at the output of the first tier corresponds, for example, to signals indicating the presence of a particular phoneme identified in the sequence of analyzed speech vectors.

The output vector provided by the SMNN $3_{20}$ at the first tier 20 is provided at the entrance of the SMNN $3_{21}$ at the second tier 21, supplemented by filling vectors ("dummy signal") if necessary, and stored in the shift registers. In a way similar to that described above for the first tier, the shift register comprises a group of registers, the vector passing from one register to the other at each frame interval of the second tier, for example every 20 milliseconds ($M_1$ times the frame interval of the first tier). The figure illustrates an example of second tier with three input registers; in practice, a greater number of registers will preferably be chosen, for example 21 registers, able to store vectors deduced from $21*M_1$ initial frames, for example vectors corresponding to 420 milliseconds of speech signal. The second tier 21 is thus able to recognize phonological elements of very much longer duration than the first tier, for example recognize parts of words or even whole words.

The structure of the second tier is similar to that of the first tier, and will therefore not be described in detail here. Again, a very much higher number of intermediate nodes will preferably be used, for example 200 nodes, and a likewise higher number of output nodes, for example 27 nodes $10_{21}$, corresponding, for example, to 27 predefined parts of words able to be identified at the output of this second tier.

In the same way as above, the output vector of the second tier 21 is decimated with a factor of decimation $M_2$ by the decimators $102_{21}$, and is provided as input vector to the shift register of the third tier 22. In a preferred variant, the third tier comprises, for example, 26 input register elements, 200 intermediate calculating elements and as many outputs as phonological elements having to be recognized, for example ten outputs in the case where the system is used only for recognition of digits of zero to nine. In continuing the digital example above, if a new vector is input every 20 milliseconds in the second tier 21 and the decimation factor $M_2$ is two, a new vector will thus be input in the third tier 22 every 40 milliseconds. With the input register comprising in this example 17 cells, the third tier therefore makes possible recognition of phonological elements starting with vectors corresponding to 17*40 milliseconds=680 milliseconds of signal. The output signals of the third tier thus make it possible to identify relatively long phonological elements, for example whole words.

The classifier described in relation to FIG. 5 thus comprises three tiers, the rate of each tier as well as the length of the input shift register being adapted to the recognition of phonological elements of different duration. It is therefore possible to train the system during a learning phase by applying at the outputs of each tier target vectors corresponding to phonological elements having to be recognized. For example, it is possible during the training to apply target vectors corresponding to phonemes at the output of the first tier 20, target vectors corresponding to syllables, triphones or portions of words at the output of the second tier 21, and target vectors corresponding to whole words at the outputs of the upper tier 22.

Preferably, according to the invention, it is also possible to set target vectors corresponding to whole words only at the outputs of the upper tier 22, and to execute the error back propagation EBP algorithm on the three tiers, the system determining itself the target vectors of the lower tiers 20 and 21. This variant has the advantage of avoiding a necessarily arbitrary decomposition of the speech into predefined phonological elements such as phonemes, triphones, syllables, etc.

One skilled in the art will understand that the invention applies itself also to multiresolution processing of sequences of speech vectors, i.e. in which vectors or components of vectors can correspond to variable durations of initial speech signal. This technology is known in particular in the field of digital filtering under the French name of "ondelettes" or by the Anglo-Saxon term of "wavelets," and is described in particular in the work of Vetterli et al. mentioned above. The SMNN of the invention make is possible to control the rate of the signals delivered and thus to easily resynchronize sequences of different rates.

The invention likewise also concerns systems comprising only one SMNN 3, i.e. networks of artificial neurons 1 whose signal provided at output is decimated by a decimator 102.

Furthermore, the invention also concerns systems in which the rate of decimation of different decimators can be varied, for example to adapt the network of neurons for different applications, or in a dynamic way during the learning phase or even as a function of speech vectors applied at the input of the system.

What is claimed is:

1. A system of neural networks, comprising:
    a plurality of tiers of interconnected neural networks, said plurality of tiers comprising an input tier for receiving a sequence of input vectors at at least a first rate,
    wherein at least two of said plurality of tiers are interconnected through at least one decimator configured to reduce the first rate of the sequence of input vectors or through at least one interpolator configured to increase the first rate of the sequence of input vectors.

2. The system according to claim 1, wherein at least the one of said neural networks includes a finite or infinite multilayer pulse response perceptron.

3. The system according to claim 1, wherein at least one of said neural networks includes a time delay neural network.

4. The system according to claim 1, wherein at least one of said neural networks includes a recurrent neural network.

5. The system according to claim 1, wherein at least one of said neural networks includes a gamma network.

6. The system according to claim 1, wherein the first rate permits recognition of predetermined speech elements of a predetermined duration in said tier.

7. The system according to claim 1, wherein the first rate permits recognition of predetermined linguistic or phonological elements in an intermediate tier.

8. The system according to claim 1, wherein the first rate permits recognition of predetermined words in said tier.

9. The system according to claim 1, wherein the first rate permits recognition of predetermined triphones in said tier.

10. The system according to claim 1, wherein the first rate permits recognition of predetermined syllables in said tier.

11. The system according to claim 1, wherein the first rate permits recognition of part of predetermined sentences in said tier.

12. The system according to claim 1, wherein the first rate is one frame every 10 milliseconds.

13. The system according to claim 1, wherein the sequence of input vectors is of variable resolution.

14. A logic unit configured for use in a system of neural networks, comprising:
    at least one spatiotemporal neural network;
    at least one input layer and at least one output layer; and
    at least one decimator or one interpolator including at least one filter configured to filter at least one output signal delivered by said spatiotemporal neural network at a first rate to said input layer, wherein said at least one decimator or one interpolator is configured to deliver said output signal from said output layer at a second rate different from said first rate.

15. The logic unit according to claim 14, wherein said second rate is lower than said first rate.

16. The logic unit according to claim 14, wherein said second rate is higher than said first rate.

17. The logic unit according to claim 14, wherein said at least one spatiotemporal neural network includes a finite or infinite multilayer pulse response perceptron.

18. The logic unit according to claim 14, wherein said at least one spatiotemporal neural network includes a time delay neural network.

19. The logic unit according to claim 14, wherein said at least one spatiotemporal neural network includes a recurrent neural network.

20. The logic unit according to claim 14, wherein said at least one spatiotemporal neural network includes a gamma network.

21. The logic unit according to claim 14, wherein the first rate permits recognition of predetermined speech elements of a predetermined duration in said tier.

22. The logic unit according to claim 14, wherein the first rate permits recognition of predetermined linguistic or phonological elements in an intermediate tier.

23. The logic unit according to claim 14, wherein the first rate permits recognition of predetermined words in said tier.

24. The logic unit according to claim 14, wherein the first rate permits recognition of predetermined triphones in said tier.

25. The logic unit according to claim 14, wherein the first rate permits recognition of predetermined syllables in said tier.

26. The logic unit according to claim 14, wherein the first rate permits recognition of part of predetermined sentences in said tier.

27. The logic unit according to claim 14, wherein the first rate is one frame every 10 milliseconds.

28. The logic unit according to claim 14, wherein the output signal includes a sequence of vectors that is of variable resolution.

29. A speech recognition system comprising:
   a plurality of logic units which are interconnected; and
   an input tier to which a sequence of input vectors is applied at at least a first rate, wherein each of said logic units include:
   at least one spatiotemporal neural network;
   at least one input layer and at least one output layer; and
   at least one decimator or one interpolator including at least one filter configured to filter at least one output signal delivered by said spatiotemporal neural network at a first rate to said input layer, wherein said at least one decimator or one interpolator is configured to deliver said output signal from said output layer at a second rate different from the first rate.

30. The speech recognition system according to claim 29, wherein said second rate is lower than said first rate.

31. The speech recognition system according to claim 29, wherein said second rate is higher than said first rate.

32. The speech recognition system according to claim 29, wherein in at least one of the logic units said at least one spatiotemporal neural network includes a finite or infinite multilayer pulse response perceptron.

33. The speech recognition system according to claim 29, wherein in at least one of the logic units said at least one spatiotemporal neural network includes a time delay neural network.

34. The speech recognition system according to claim 29, wherein in at least one of the logic units said at least one spatiotemporal neural network includes a recurrent neural network.

35. The speech recognition system according to claim 29, wherein in at least one of the logic units said at least one spatiotemporal neural network includes a gamma network.

36. The speech recognition system according to claim 29, wherein in at least one of the logic units the first rate permits recognition of predetermined speech elements of a predetermined duration in said logic unit.

37. The speech recognition system according to claim 29, wherein in at least one of the logic units the first rate permits recognition of predetermined linguistic or phonological elements in an intermediate logic unit.

38. The speech recognition system according to claim 29, wherein in at least one of the logic units the first rate permits recognition of predetermined words in said logic unit.

39. The speech recognition system according to claim 29, wherein in at least one of the logic units the first rate permits recognition of predetermined triphones in said logic unit.

40. The speech recognition system according to claim 29, wherein in at least one of the logic units the first rate permits recognition of predetermined syllables in said logic unit.

41. The speech recognition system according to claim 29, wherein in at least one of the logic units the first rate permits recognition of part of predetermined sentences in said logic unit.

42. The speech recognition system according to claim 29, wherein in at least one of the logic units the first rate is one frame every 10 milliseconds.

43. The speech recognition system according to claim 29, wherein in at least one of the logic units the output signal includes the sequence of input vectors, and the sequence of input vectors is of variable resolution.

44. The speech recognition system according to claim 29, wherein said input vectors correspond to speech vectors.

45. The speech recognition system according to claim 44, further comprising a parameterizer configured to determine said speech vectors starting from a digital speech signal.

46. The speech recognition system according to claim 29, wherein said speech recognition system is trained with an error back propagation algorithm and target vectors applied independently at an output of each tier of the logic units or at an output of each logic unit.

47. The speech recognition system according to claim 29, wherein said speech recognition system is trained with an error back propagation algorithm and a target vector applied only at a global output of the system.

* * * * *

UNITED STATES PATENT AND TRADEMARK OFFICE
CERTIFICATE OF CORRECTION

PATENT NO. : 6,799,171 B1 Page 1 of 1
DATED : September 28, 2004
INVENTOR(S) : Van Kommer It is certified that error appears in the above-identified patent and that said Letters Patent is hereby corrected as shown below:

Title page, Item [54] and Column 1, line 1,
Title, should read -- SPEECH RECOGNITION SYSTEM USING NEURAL NETWORKS --

Title page,
Items [86] and [87], should read:
-- [86] PCT No.: PCT/CH98/00495
§ 371 (c)(1),
(2), (4) Date: Mar. 1, 2001

[87] PCT Pub. No.: WO 00/13170
PCT Pub. Date Mar. 9, 2000 --

Signed and Sealed this

Fourteenth Day of December, 2004

JON W. DUDAS
*Director of the United States Patent and Trademark Office*